United States Patent [19]

Pratt et al.

[11] Patent Number: 4,764,199
[45] Date of Patent: Aug. 16, 1988

[54] METHOD OF PREPARING MUSHROOM GROWING SUPPLEMENTS FROM CORN GLUTEN MEAL

[75] Inventors: George W. Pratt, Cedar Rapids; Dennis W. Caton, Marion; Duane O. Tackaberry, Cedar Rapids, all of Iowa

[73] Assignee: Penford Products, Cedar Rapids, Iowa

[21] Appl. No.: 896,394

[22] Filed: Aug. 13, 1986

[51] Int. Cl.[4] ............................................... C05F 5/00
[52] U.S. Cl. .............................................. 71/5; 47/1.1
[58] Field of Search ................................... 71/5; 47/1.1

[56] References Cited

U.S. PATENT DOCUMENTS

| | | | |
|---|---|---|---|
| 3,560,190 | 2/1971 | Hughes et al. | 47/1.1 |
| 3,942,969 | 3/1976 | Carroll, Jr. et al. | 71/5 |
| 4,170,842 | 10/1979 | Stoller | 71/5 |
| 4,534,781 | 8/1985 | Wu et al. | 71/5 |
| 4,537,613 | 8/1985 | Pebeyre et al. | 71/5 |
| 4,617,047 | 10/1986 | Bretzloff | 71/5 |

OTHER PUBLICATIONS

Maltz, *Protein Food Supplements*, "Protein Products Derived from Corn", 1981, pp. 219–222.

*Primary Examiner*—Ferris H. Lander
*Assistant Examiner*—Ellen McAvoy
*Attorney, Agent, or Firm*—Marshall, O'Toole, Gerstein, Murray & Bicknell

[57] ABSTRACT

A mushroom growing supplement is prepared from acidic corn gluten meal by mixing with aqueous formaldehyde while maintaining the meal in free-flowing condition. The treated meal is then packaged without heating or drying and is ready for use by mushroom growers.

8 Claims, No Drawings

METHOD OF PREPARING MUSHROOM GROWING SUPPLEMENTS FROM CORN GLUTEN MEAL

FIELD OF INVENTION

The field of this invention is proteinaceous supplements for use in mushroom cultivating and methods for preparing such mushroom-growing supplements.

BACKGROUND OF INVENTION

Mushroom growing supplements have been prepared from cottonseed and soybean meals as described in U.S. Pat. No. 3,942,969. The meal is subjected to a protracted reaction with formaldehyde to denature the protein and thereby reduce its solubility and bio-availability. Several reaction procedures are described in the patent; namely, (1) vapor treatment, (2) liquid formaldehyde denaturing, and (3) low volume liquid formaldehyde denaturing.

For the vapor treatment, 37% aqueous formaldehyde was evaporated in an oven containing the supplement and equipped with a circulation fan. To denature two pounds of supplement, over three quarts of formaldehyde solution were vaporized in a period of 32 hours. The treated supplement was then dried for an additional sixteen hours.

In the liquid formaldehyde denaturing, the meal was mixed with 4% aqueous formaldehyde. The meal was allowed to stand in the solution for an hour with occasional stirring. Then the meal was dewatered, washed, and dried in trays at 212° F. for 48 hours.

The low volume liquid formaldehyde denaturing procedure used a 10% aqueous formaldehyde solution which was mixed with the meal at the rate of 2.3 ounces of solution per pound of meal, then placed in airtight containers, and incubated at room temperature for 20 hours. Thereafter, the treated meal was dried in a vented oven at 212° F. for 12 to 14 hours.

All of the foregoing procedures used large amounts of the formaldehyde treating solution and required lengthy treatment times for reaction completion. Further, the resulting products were wet meals, requiring dewatering or drying. A dry free-flowing product is desired for packaging and use by mushroom growers. In the prior art procedures, drying was also apparently necessary to remove excess unreacted formaldehyde from the treated meal.

Notwithstanding the difficulties and expense of preparing mushroom growing supplements by previously known procedures, such supplements have become an important product for use by mushroom growers in the United States. The formaldehyde-treated meals are added by most mushroom growers to the compost at the time of spawning. Some growers also add treated meal at the time of casing, preparatory to mushroom production.

The advantages obtained by using formaldehyde-treated meal supplements have been described. See, Randle (1983) *Crop Research*, 23(1):51–69. Among the reported advantages is that overheating of the compost during spawning is controlled, while providing protein nutrient for later use by the growing mushrooms. Also, the meal additive is protected from attack by other microorganisms until the mushroom mycelia become established. In addition, greater mushroom production per "flush" or "break" has been reported.

U.S. Pat. No. 3,942,969 mentions "corn gluten" together with many other kinds of vegetable and protein meals, for possible use in producing a mushroom supplement. However, as far as is known, corn gluten meal has not been used commercially or ever tested experimentally as a mushroom growing supplement. Prior to the present invention, the potential advantages of corn gluten meal over other vegetable meals does not appear to have been recognized.

Moreover, U.S. Pat. No. 3,942,969 advises that "only small amounts of sugars or starches can be tolerated" in mushroom supplements. Corn gluten meal can contain from 13 to 25% starch (dry basis), the more usual range being 16 to 22%.

SUMMARY OF INVENTION

This invention is based in part on the discovery that corn gluten meal has unexpectedly desirable properties for producing a mushroom growing supplement by reaction with formaldehyde.

The new supplement can be added to the mushroom composts at spawning and/or at casing, but the spawning use is the most important.

In the wet milling of corn, the corn is steeped in sulfur dioxide-containing water. The acid condition of this soak carries through in the production of the corn gluten meal by-product, which typically has a moderately acid pH (e.g., 3–4).

It has been found that acid corn gluten meal is highly reactive with aqueous formaldehyde. This promotes sufficient denaturation of the protein of the meal to be obtained without protracted formaldehyde treatment. Also, the formaldehyde can be applied in a limited volume of water so that it is not necessary to dry the meal after treatment.

Another related advantage is that essentially all of the applied formaldehyde reacts with the protein of the meal and becomes bound thereto, leaving no excess formaldehyde requiring removal. Apparently a surface treatment of the meal particles with a concentrated, limited volume formaldehyde solution is sufficient to prepare the corn gluten meal particles for use as a mushroom growing supplement.

Typically, corn gluten meal contains a substantial amount of "fines", viz. particles which pass through a 100 mesh screen. The presence of such fines can be objectionable in the handling and use of a mushroom supplement, the fines being subject to air dispersal during the emptying of the bags and during mixing of the supplement with the compost. This potential disadvantage of supplements prepared from corn gluten meal can be partially corrected by incorporating a small amount of corn steepwater solids in the meal. Steepwater is also a by-product of wet corn milling, and is therefore readily available for incorporation in corn gluten meal. The protein present in the steepwater solids can be conditioned with formaldehyde in the same manner and to the same extent as the corn gluten protein. When the steepwater is added to the corn gluten prior to or at the same time as the formaldehyde treating solution, the intermixing of the steepwater, formaldehyde solution and corn gluten will result in reaction of the formaldehyde with the steepwater protein as well as with the corn gluten protein. As an alternative procedure, formaldehyde may be added to the steepwater at the same level as for treating corn gluten, and this premixed steepwater can be mixed with the corn gluten meal either before, during, or subsequent to the addition of the formaldehyde solution. These treatments substantially reduce the amount of fines in the meal.

DETAILED DESCRIPTION

Corn gluten meal for use in practicing this invention preferably has a starting moisture content below 15.0% by weight, such as within the range from 4 to 14% by weight. Selection of low moisture meal is desirable so that the treated meal will have a moisture content no higher than 16.0%. The meal at the start of treatment is in a particulate free-flowing condition and should remain in that condition until treatment is completed. It is then not necessary to dry the treated meal. A preferred starting moisture content of the meal to be treated is in the range from 9 to 12% by weight water.

The corn gluten meal starting material should have a high protein content, such as from 50-75% protein (dry basis). (The solids of corn gluten meal are usually expressed on a dry basis). Typically, with reference to preferred embodiments, the corn gluten meal will contain from 60 to 70% protein (dry basis). The pH of the meal will be within the range of 2.0 to 5.5, such as usually within the range for pH 2.8 to 4.2. Corn gluten meal also contains substantial amounts of carbohydrate, ranging from 13 to 25% (dry basis).

Formaldehyde solution for treating the meal can be a concentrated aqueous solution containing from 20 to 50% by weight formaldehyde. Commercially-available 37% formaldehyde solutions can be used as such. More generally, a preferred concentration is from 30 to 45% by weight formaldehyde. By using such a formaldehyde concentrate and applying a limited volume of solution, the amount of water added to the corn gluten meal can be kept below an amount which would result in wet meal requiring drying.

Formaldehyde treatment levels can correspond with those previously used for cottonseed meal or soybean meal, even though corn gluten meal contains a higher proportion of protein. For example, treatment levels of from 0.05 to 1.0% formaldehyde by weight based on the meal (moist basis) are sufficient. In preferred embodiment, a treatment level of from 0.10 to 0.25% by weight formaldehyde can be used. By distributing the limited volume of the solution throughout the meal particles, an essentially suface treatment of the particles can be obtained. The use of larger solution volumes which would cause the solution to penetrate to interiors of the gluten particles is not required.

The mixing of the formaldehyde solution with the meal can be carried out in standard animal feed mixing equipment. Either batch or continuous mixers can be used. In one procedure believed to be preferred, mixing is carried out in a continuous screw-type mixer. In batch mixing, it is preferred to add the formaldehyde solution gradually so that it is distributed throughout the meal being treated, the meal being continually mixed as the solution is added. Such batch mixing can be completed in less than 60 minutes, such as in 25 to 35 minutes, after addition of all the ingredients to the mixer. With a screw-type mixer, the formaldehyde solution may be proportionately added to increments of the meal as they are introduced into the mixer, thereby obtaining a rapid distribution of the solution in the meal. With this type of continuous mixing, treatment of the meal can be completed in a few minutes.

In accordance with the present invention, it is not necessary to heat the meal before, during, or after formaldehyde treatment. The addition to and mixing of the meal with the formaldehyde solution can be carried out at ambient room temperatures, such as from 60 to 115° F. On completion of the addition of the steepwater and/or formaldehyde solution and its mixing with the meal the product is ready for packaging. No excess formaldehyde requiring removal will be present. The product without further treatment can be placed in containers for shipment to mushroom growers. For example, flexible bags can be used. Typically, such bags are formed of multilayered kraft paper and will hold 50 pounds of the treated meal. Other types and sizes of packages or containers can be used.

Where the corn gluten meal contains a substantial amount of ultrafine particles, it is advantageous to add corn steepwater solids. For example, corn gluten meal may contain from 6 to 12% of minus 100 mesh (U.S. Standard Screen) material. By adding a small amount of corn steepwater solids, and intermixing these solids with the meal, the amount of fines can be appreciably reduced, such as by 25 to 75%.

In commercial corn wet milling practice, cornsteep water is produced in two concentrations, the higher concentrate containing from about 35 to 55% solids, and the lower concentrate containing from about 5 to 15% solids. For purposes of the present invention, blends of these concentrates can be prepared to achieve the optimum solids concentrate to limit the amount of water being added with the solids. For example, steepwater containing from 5 to 55% solids can be used, and a preferred range is from about 20 to 40% solids. Based on the weight of the meal being treated, from 0.3 to 10% steepwater solids can be added. Usually, however, from about 1.5 to 2.5% dry solids based on the dry substance meal is an adequate addition.

Since the steepwater solids contain protein, usually in the range of about 40 to 50% protein on the dry substance, it is desirable to react the protein with formaldehyde. In one procedure, formaldehyde can be added to the steepwater in an amount corresponding to 0.05 to 1.0% based on the steepwater solids. The formaldehyde-steepwater premix can then be added to the corn gluten meal, before, during, or after addition of the formaldehyde solution for treating the meal. In another procedure, steepwater solids are added either prior to or during the addition of the formaldehyde solution. By concurrently intermixing the steepwater solids the formaldehyde solution, and the corn gluten meal, the formaldehyde reacts with the steepwater protein as well as the meal protein. The total amount of water added with the steepwater should be limited. The moisture content of the final treated meal should not exceed 16.0%. For this reason when steepwater is added the initial moisture content of the corn gluten meal is preferably within the range from 9 to 12%.

The method of this invention and the supplements produced thereby are further illustrated by the following examples.

EXAMPLE I

A 600 pound batch of formaldehyde treated corn gluten meal was made in a pilot paddle mixer. The batch was prepared by adding 35% aqueous formaldehyde solution at 0.1% dry gluten meal substance to formaldehyde. The batch was mixed 20 minutes and bagged-off in 50 pound bags.

| Batch Analysis | |
| --- | --- |
| Moisture = | 13.35% |
| pH (1:5) = | 3.7 |
| Protein (dry basis) = | 70.37 |

EXAMPLE II

To compare the effect of various treatments reducing the amount of fines several materials available from the corn processing industry were evaluated. Five different materials were used in a laboratory paddle mixer. Batches consisted of 1000 gm of corn gluten meal with the material being added slowly to the corn gluten meal as it mixed. After addition of the control agent the batch was blended for another twenty minutes before testing for moisture, protein and particle size.

PARTICLE SIZE DISTRIBUTION OF CORN GLUTEN MEAL AFTER BLENDING WITH VARIOUS SUBSTANCES

Blended in Laboratory Hobart Mixer
1. Corn Gluten Meal
2. w. Glucose Solution, unrefined (35% D.S.), 5% w/w
3. w. Refined Corn Oil, 0.5%
4. w. Light Steepwater, 5% w/w
5. w. Mixed Steepwaters, 5% w/w
6. w. Heavy Steepwater, 5% w/w

| Screen Mesh | 1 | 2 | 3 | 4 | 5 | 6 |
| --- | --- | --- | --- | --- | --- | --- |
| 12 | .2 | .2 | .2 | .2 | .2 | .4 |
| 20 | 13.2 | 13.6 | 12.9 | 13.5 | 13.3 | 13.7 |
| 40 | 28.8 | 29.4 | 30.2 | 30.3 | 29.9 | 29.9 |
| 100 | 43.6 | 44.6 | 47.6 | 48.7 | 49.7 | 47.3 |
| Minus 100 mesh | 14.5 | 12.1 | 9.2 | 7.1 | 6.7 | 8.4 |
| Moisture | 10.58 | 13.06 | 10.67 | 14.10 | 13.40 | 12.48 |
| Protein | 67.6 d.s.b. | 63.60 d.s.b. | 66.86 d.s.b. | 66.10 d.s.b. | 66.43 d.s.b. | 66.20 d.s.b. |

EXAMPLE III

To demonstrate the effect of steepwater solid in reducing fines (minus 100 mesh) three batches of treated corn gluten meal were prepared in a pilot paddle mixer. Between 250 and 300 pounds of corn gluten meal was charged to the mixer for each batch. Formaldehyde solution (35%) was added on the basis of 0.1% dry substance formaldehyde to as is corn gluten meal. The formaldehyde was added slowly to the mixing corn gluten meal and allowed to blend for twenty minutes before adding the steepwater. Steepwater containing various dry solids that were readily available from the corn wet milling process were used. Each batch was blended at 5% as is steepwater to as is corn gluten meal. The steepwater was added slowly to the mixer and the steepwater allowed to blend for another twenty minutes. The product was then packed directly into 50 pound paper bags for commercial evaluation.

Blended in Pilot Plant Mixer
A, B, and C are starting material for $A_T$, $B_T$, and $C_T$, respectively.
$A_T$. w. Light Steepwater, 5% w/w (21.15% Dry Substance)
$B_T$. w. Mixed Steepwaters, 5% w/w (2.5% Light Steepwater, 2.5% Heavy Steepwater, 32.57% Dry Substance)
$C_T$. w. Heavy Steepwater, 5% w/w (48.25% dry substance)

| Screen Mesh | A | $A_T$ | B | $B_T$ | C | $C_T$ |
| --- | --- | --- | --- | --- | --- | --- |
| 12 | .4 | .8 | .4 | .7 | .5 | .5 |
| 20 | 18.2 | 20.5 | 23.6 | 24.1 | 27.2 | 26.0 |
| 40 | 35.3 | 37.5 | 35.6 | 37.9 | 36.4 | 38.1 |
| 100 | 37.5 | 36.7 | 33.7 | 33.5 | 29.6 | 29.5 |
| Pan | 8.6 | 4.6 | 6.7 | 3.8 | 6.3 | 5.9 |
| pH | 3.80 | 3.80 | 3.81 | 3.81 | 3.80 | 3.83 |
| Moisture | 11.11% | 14.49 | 11.10 | 14.20% | 10.71% | 12.72% |
| Protein | 64.57% d.s.b. | 63.54% d.s.b. | 62.97% d.s.b. | 63.74% d.s.b. | 63.68% d.s.b. | 63.18% d.s.b. |
| Ash | 1.21% d.s.b. | 1.33% d.s.b. | 1.11% d.s.b. | 1.62% d.s.b. | 1.18% d.s.b. | 1.80% d.s.b. |
| Oils | 2.67% d.s.b | 3.64% d.s.b. | 2.81% d.s.b. | 3.43% d.s.b. | 2.92% d.s.b. | 3.05% d.s.b. |

While the foregoing specification has described formaldehyde as the preferred reagent for treating the corn gluten means, other aldehyde reagents could be substituted on a molar equivalent basis for the specified weight percentages of formaldehyde. Such reagents include glyoxal, acetoldehyde, glutaraldehyde, etc.

We claim:

1. The method of preparing a mushroom growing supplement, comprising:

(a) obtaining a corn gluten meal containing by weight less than 15% moisture and from 50 to 75% protein (dry basis), said meal being in particulate free-flowing condition and having an pH within the range from 20. to 5.5;

(b) mixing and reacting said meal proportionately with a 20 to 50% by weight concentration of aqueous formaldehyde added and reacted as a liquid solution, the selected proportions of formaldehyde solution to meal providing from 0.05 to 1.0% by weight formaldehyde based on the meal (starting wet basis), said mixing being effective to distribute said aqueous formaldehyde solution throughout the meal, the amount of water thereby added to said meal being less than an amount increasing the water content of the meal above 16.0%, said meal remaining in a free-flowing condition throughout the mixing, the reaction of the meal with the formaldehyde solution being carried out under ambient room conditions and being completed in less than 60 minutes after the addition of the formaldehyde solution; and (c) without heating or drying the reacted meal packaging it in containers for shipment to mushroom growers.

2. The method of claim 1 in which said meal contains by weight from 9 to 12% moisture, from 60 to 70% protein (dry basis), and has a pH of from 2.8 to 4.2.

3. The method of claim 1 in which said aqueous formaldehyde has a concentration of from 30 to 45% by weight formaldehyde, and the selected proportion provides from 0.10 to 0.25% by weight formaldehyde based on the weight of the meal (wet basis).

4. The method of claim 1 in which said mixing and reacting is carried out at an ambient room temperature of 60° to 115° F. in a batch mixer.

5. The method of claim 1 in which said mixing and reacting is carried out at an ambient room temperature of 60° to 115° F. in a continuous screw-type mixer, the aqueous formaldehyde solution being proportionately added to increments of said meal as they are passed through said mixer.

6. The method of preparing a mushroom growing supplement, comprising:

(a) obtaining a corn gluten meal containing by weight from 9 to 12% moisture and from 60 to 70% protein (dry basis), said meal being in particulate free-flowing condition and having a pH within the range from 2.8 to 4.2;

(b) mixing and reacting said meal proportionately with a 30 to 45% by weight concentration of aqueous formaldehyde added and reacted as a liquid solution, the selected proportions of formaldehyde solution to meal providing from 0.10 to 0.25% by weight formaldehyde based on the meal (starting wet basis), said mixing being effective to distribute said aqueous formaldehyde solution throughout the meal, said meal remaining in a free-flowing concentration throughout the mixing, the reaction of the meal with the formaldehyde solution being carried out under ambient room conditions and completed in less than 60 minutes after the addition of the formaldehyde solution; and (c) without heating or drying the reacted meal packaging it in containers for shipment to mushroom growers.

7. The method of claim 1 in which cornsteep water is added to said meal and mixed therewith prior to or during the mixing of said aqueous formaldehyde solution, said steepwater having a solids contents of from 5 to 55% by weight and from 0.3 to 10.0 weight percent steepwater solids being added based on the meal, the resulting reacted meal having a water content of not over 16.0%.

8. The method of claim 1 in which formaldehyde-containing cornsteep water is added to said meal and mixed therewith before, during, or after the mixing of said aqueous formaldehyde solution, said steepwater containing from 5 to 55% by weight solids and having a formaldehyde content based on the solids therein of 0.05 to 1.0% by weight, from 0.3 to 10.0 weight percent steepwater solids being added based on the meal (starting wet basis), the resulting reacted meal having a water content of not over 16.0%.

* * * * *

UNITED STATES PATENT AND TRADEMARK OFFICE
CERTIFICATE OF CORRECTION

PATENT NO. : 4,764,199

DATED : August 16, 1988

INVENTOR(S) : Pratt et al.

It is certified that error appears in the above-identified patent and that said Letters Patent is hereby corrected as shown below:

Column 4, lines 66-67, "at 0.1% dry gluten meal substance to formaldehyde" should read --at 0.1% dry substance formaldehyde to corn gluten meal--. Column 7, line 17, "concentration" should read --condition--.

Signed and Sealed this

Twenty-fourth Day of January, 1989

Attest:

DONALD J. QUIGG

Attesting Officer     Commissioner of Patents and Trademarks